(12) United States Patent
Walther et al.

(10) Patent No.: US 8,366,534 B2
(45) Date of Patent: *Feb. 5, 2013

(54) SYSTEMS AND METHODS FOR CONDUCTING A SWEEPSTAKES IN A GAMING ENVIRONMENT

(75) Inventors: Stephen J. Walther, Las Vegas, NV (US); Lael Berelowitz, Las Vegas, NV (US)

(73) Assignee: Aristocrat Technologies Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/176,108

(22) Filed: Jul. 5, 2011

(65) Prior Publication Data

US 2011/0269521 A1    Nov. 3, 2011

Related U.S. Application Data

(63) Continuation of application No. 12/751,035, filed on Mar. 31, 2010, now Pat. No. 8,016,660, which is a continuation of application No. 11/838,073, filed on Aug. 13, 2007, now Pat. No. 7,744,456.

(60) Provisional application No. 60/822,190, filed on Aug. 11, 2006.

(51) Int. Cl.
*A63F 13/12* (2006.01)

(52) U.S. Cl. ............... 463/17; 463/16; 463/25; 463/29; 273/138.1; 273/139; 705/14.12; 705/44

(58) Field of Classification Search ............. 463/16–23, 463/25–30, 39–43, 45, 47; 273/138.1, 138.2, 273/139, 141 A, 454–456, 460; 705/14.12, 705/17, 39, 44; 709/203–207; 713/1, 100, 713/150, 182, 187, 189–190; *A63F 13/12*
See application file for complete search history.

(56) References Cited

U.S. PATENT DOCUMENTS

| | | | |
|---|---|---|---|
| 6,454,650 B1 * | 9/2002 | Aronin ........................... | 463/17 |
| 7,241,219 B2 * | 7/2007 | Walker et al. ................... | 463/20 |
| 2001/0039511 A1 * | 11/2001 | Duckworth et al. ............ | 705/14 |
| 2006/0224456 A1 * | 10/2006 | Walker et al. ................... | 705/14 |

\* cited by examiner

*Primary Examiner* — Arthur O. Hall

(74) *Attorney, Agent, or Firm* — McAndrews, Held & Malloy, Ltd.

(57) ABSTRACT

Certain embodiments provide systems and methods for sweepstakes awards in a gaming environment. Certain embodiments provide a method including accumulating sweepstakes entries for a player based on at least one sweepstakes entry criterion and randomly selecting a winner from the pool of sweepstakes entries. The sweepstakes entries are associated with the player and incorporated in a pool of sweepstakes entries. In certain embodiments, the at least one sweepstakes entry criterion comprises at least one of one entry per player, accumulating points based on play, accumulating points based on machine outcome, and coin in. In certain embodiments, the method further includes determining eligibility of a player for the sweepstakes. In certain embodiments, eligibility is determined based on at least one of a player group, a machine group, a machine denomination, a machine type, a machine manufacturer, a game manufacturer, a game theme and a game title, for example.

7 Claims, 7 Drawing Sheets

SYSTEMS AND METHODS FOR CONDUCTING A SWEEPSTAKES IN A GAMING ENVIRONMENT

RELATED APPLICATIONS

This application claims priority to, and is a continuation of, co-pending U.S. application Ser. No. 12/751,035 having a filing date of Mar. 31, 2010 and U.S. application Ser. No. 11/838,073, now U.S. Pat. No. 7,744,456, having a filing date of Aug. 13, 2007, which claims priority to U.S. Provisional Application No. 60/822,190 having a filing date of Aug. 11, 2006, the contents of which are incorporated herein by reference in their entirety.

FIELD OF THE INVENTION

This invention relates to gaming systems, and more particularly relates to providing sweepstakes awards to gaming locations.

BACKGROUND OF THE INVENTION

Gaming machines, such as slot machines, fruit machines, or poker machines, have in recent years become one of the more popular, exciting, and sophisticated wagering activities available at casinos and other gambling locations. At the same time, gaming machines have also become a source of greater revenue for gaming establishments. Thus, competition between manufacturers of gaming machines has intensified as competitors vie for business from gaming establishments.

A large gaming casino typically employs thousands of gaming machines that can be operated simultaneously. These gaming machines can be used to simultaneously play multiple games using multiple rewards. A gaming system providing entertaining and enticing features for players would be highly desirable to attract both new and returning players to a gaming establishment. Additionally, a gaming system that allows customization and dynamic modification by an operator would be highly desirable to provide new features to customers. Current gaming machines are difficult to reconfigure and offer the same game to multiple users at multiple gaming establishments. Certain games may become old, unattractive or simply unpopular to players and need updating or replacing.

At certain times, game play in casinos is historically slow, and, at certain times, game play in casinos is historically busy. However, even at busy times, a level of excitement in a casino may not be as high as it could be. Certain embodiments of the present invention addresses problems presented by current casino game play and provide one or more solutions.

One method used to provide increased excitement in a casino is a progressive jackpot system wherein the progressive prize is shared among eligible players. Players become eligible by placing a maximum bet at a gaming machine and initiating play at the gaming machine within a certain time before the progressive jackpot is won. The amount of a player's bet and the time interval between a player's bet and the award of the jackpot is used to determine a player's eligibility to share in the progressive prize. U.S. Pat. No. 5,564,700 is an example of such a prior art shared progressive jackpot system.

Additionally, some casinos offer in their live Poker rooms a "Bad Beat" jackpot that may be paid to multiple casino patrons when a "Bad Beat" occurs. A "Bad Beat" is defined as one player with a qualifying poker hand losing to another player with a better hand that is also qualifying. Generally, when a bad beat occurs at a casino poker room, anyone currently playing either at that table or at that casino may share in at least a portion of the "Bad Beat" jackpot. Other options to entertain casino patrons include a bonus prize awarded when a threshold value is accumulated in the progressive bonus pool.

BRIEF SUMMARY OF THE INVENTION

Certain embodiments provide systems and methods for sweepstakes awards in a gaming environment.

Certain embodiments provide, in a gaming system having one or more gaming devices for play by players, a method for awarding promotional awards. The method includes accumulating sweepstakes entries for a player based on at least one sweepstakes entry criterion. The sweepstakes entries are associated with the player and incorporated in a pool of sweepstakes entries. The method also includes randomly selecting one (or possibly more) winner(s) from the pool of sweepstakes entries based at least in part on a number of sweepstakes entries associated with the player.

Certain embodiments provide a gaming system in communication with one or more gaming devices for play by players for providing sweepstakes awards. The system includes a monitor configured to detect activity at a gaming device in the gaming system. The monitor determines satisfaction of a sweepstakes eligibility criterion for the award. The monitor accumulates sweepstakes entries for the players based on at least one sweepstakes entry criterion. The sweepstakes entries are associated with the player and incorporated in a pool of sweepstakes entries. The system further includes a sweepstakes announcer randomly selecting a winner(s) from the pool of sweepstakes entries.

Certain embodiments provide a computer-readable medium having a set of instructions for execution on a processor. The set of instructions include a game monitoring routine for detecting activity at a gaming device in the gaming system. The monitoring routine determines satisfaction of a sweepstakes criterion for the award. The monitor routine accumulates sweepstakes entries for the players based on at least one sweepstakes entry criterion. The sweepstakes entries are associated with the players and incorporated in a pool of sweepstakes entries. The set of instructions also includes a sweepstakes announcement routine randomly selecting one or more winner(s) from the pool of sweepstakes entries based at least in part on a number of sweepstakes entries associated with the player.

Figure 1:
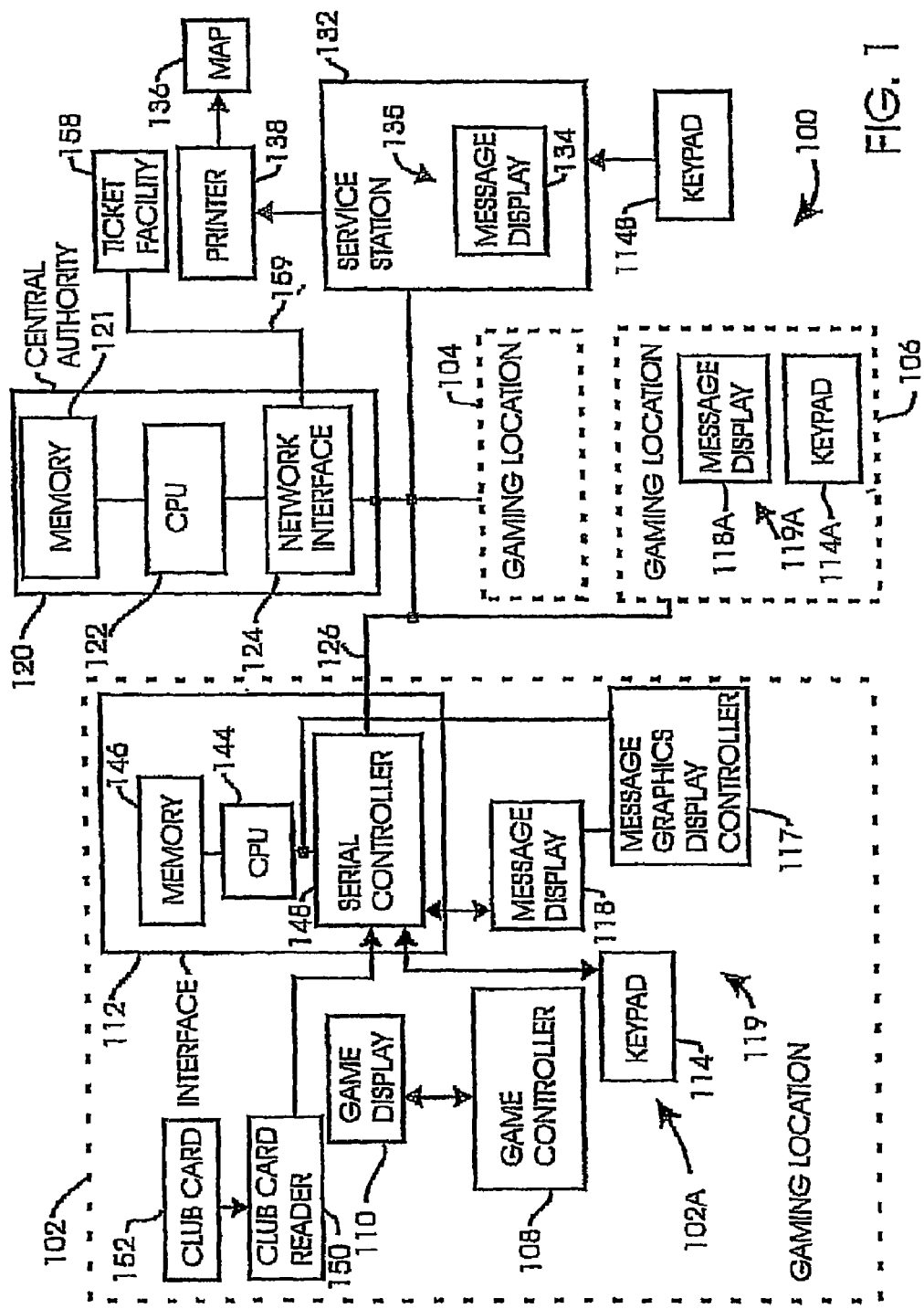
FIG. 1 is a schematic block diagram of one form of gaming system employing a gaming location message display made in accordance with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

Referring to FIG. 1, gaming system 100 includes a several gaming locations 102, 104 and 106 that may include various non-machine games, such as craps and blackjack, or may include game machines, such as slot machines, video poker machines, video roulette machines, and the like. It should be understood that, while the present description may refer to "slot" or video poker gaming machines or terminals, gaming tables such as Blackjack, Pai Gow, Baccarat, multi-terminal gaming machines such as multi-terminal roulette, Sik Bo, Poker, dice games, and others may also be included. As an example, a gaming table layout may be embodied as a video display and/or connected to an electronic communication network. Thus, gaming location as used herein includes gaming tables as well as gaming terminals or machines.

Gaming location 102 is exemplary of gaming locations 104 and 106. If gaming location 102 includes a gaming machine 102A, a game controller 108 and a game display 110 are provided. For both a non-machine gaming location and a game machine location, a location interface 112, an optional alphanumeric keypad 114 and a touch screen message display 118 are provided. Display 118 may comprise a touch screen liquid crystal display (LCD) similar to the displays used in laptop computers, for example. Display 118 is coupled to or located inside the cabinet of gaming machine 102A. Using an LCD disposed on the gaming machine in order to display graphics images and to display a numeric or alphabetic input image is advantageous because it eliminates the need for a separate keypad for the interactive entry of data. In addition, an LCD requires less space than many other types of displays. An optional alphanumeric keypad 114 may be placed for convenient manipulation while a player is using gaming location 102.

A conventional graphics display controller 117 controls display 118. Controller 117 can display either vector graphics or bit-mapped graphics on display 118, depending the type of application program stored in memory 146 used for graphic display and the type of data stored for purposes of generating graphics images. The image data resulting in graphics images can be stored in memory 146 or can be stored in memory 121 and transmitted via network 126 to controller 117 for a particular graphic image. The image data can be either vector data or bit-mapped data. CPU 144 controls the transfer of the image data to controller 117 in response to application programs stored in memory 146 that determine the location of the graphics images on display 118 and also determine the time at which the graphics displays are presented.

Interface 112, optional keypad 114, controller 117 and display 118 comprise an interactive communication unit 119. Each of the gaming locations 104 and 106 include an interactive communication unit like unit 119. For example, gaming location 106 includes a communication unit 119A like unit 119. In one embodiment, a player enters alphabetic and numeric information by touching display 118. In such an embodiment, keypad 114 may not be provided. For the non-machine gaming locations, interface 112 comprises a communication controller 148, such as a modem.

In this specification and claims, interactive indicates being capable of accepting input from a human. Communication unit 119 comprises one or more programs for accepting such input from, for example, a touch screen alphanumeric keyboard image. Such programs are well known to those skilled in computer communication.

For a game machine location, interface 112 may include, for example, an RS485 interface such as that implemented by a Sentinel™ Interface from Aristocrat Technologies Inc. Other interfaces and network architectures (e.g., Ethernet, parallel port, and the like) may be substituted however. Furthermore, interface 112 may implement, for example, the IGT Gaming SAS™ communication protocol or the Aristocrat GDAP™ communication protocol for communication with gaming machine 102A, or a custom communication protocol. In gaming machine 102A, message display 118 may be coupled to the gaming machine or may be inside the cabinet of the gaming machine. However, any association or communication between display 118 and gaming machine 102A may be used as long as display 118 is visible from gaming machine 102A.

The display 118 for the interface 112 may also be embodied as a portion of the gaming location 119 game display 110. For example, a portion of a main or secondary game display may be used as the display 118.

Interface 112 is programmed to provide an interactive messaging operation. That is, user message activity, such as touching an active area of display 118 or entering information from keypad 114, causes a response from or action by system 100. One such response is the sending of data over network 126 to another location within system 100 so that a message is displayed. Another response is the display of a menu that depends on the area touched and/or user preferences.

User preferences may be stored in interface memory 146 that is controlled by a CPU 144. CPU 144 controls the sending of messages by gaming location 102, the receipt of messages by gaming location 102 and the display of messages by gaming location 102 in a well known manner.

Game controller 108 is responsible for operation of the gaming machine 102A. Thus the game controller 108 may include a microprocessor, memory, game software, and support circuitry to implement a slot machine or other type of game. The display 110 provides displays or other graphics/video used for the play of the game, such as a display of slot machine reels, game indicia, bonus game features and the like. The forgoing is known in the prior in electronic gaming machines (EGMs) manufactured by Aristocrat, IGT, WMS and others.

Gaming location 102 also includes a loyalty club card reader 150 that can read a MAG number (e.g., a magnetically represented or encoded number) located on a magnetic strip of a club card 152, which may, for example, be a smart card. The MAG number is unique for each player. Card 152 also sometimes bears a player ID number that is human readable, but is not machine-readable. The card reader sends the MAG number to central authority 120, which converts the MAG number to an OCR (optical character recognition) number (e.g., a number that can be optically recognized or scanned). This feature prevents any potential misuse due to fraudulent creation of a bogus club card. Memory 121 maintains a table that correlates OCR numbers with player ID (identification) numbers. An example of misuse prevented or inhibited by converting the MAG number to an OCR number is as follows. The clerks at the stations generally have access to the OCR numbers, but not the MAG numbers. As a result, a person operating outside system 100 could not duplicate a new player card with a MAG number corresponding to an existing club card. If such a person could duplicate an existing club card, the person may be tempted to use the duplicate card to cash out a player's account. The conversion of the MAG number to an OCR number is a feature that inhibits such temptation.

Central authority 120 translates an OCR number to a corresponding player ID number. This feature allows a single player ID number to identify more than one OCR number. The player ID number can be used by the central authority to address the value of an account corresponding to the player ID number maintained by or in association with the central authority 120 or to access preferences of the player. Thus, the central authority may not maintain or store an account value or preferences corresponding to the MAG number or OCR number; it may only keep an account value and preferences corresponding to the player ID number, correlated with the OCR number by a table or other data structure.

Player preferences may include preferences for drinks, cigarettes/cigars, food, snacks, shows, hotels, rentals, reservations, and the like. In addition, memory 121 may store a preference authorizing the player to be located by having central authority 120 correlate his or her player ID number with the gaming location at which his or her club card 152 was read.

When central authority 120 locates a player, it sends data to station 132 via network 126 that results in an electronic or printed display. For example, a printed display may result in a map 136 printed by a printer 138 attached to the station. Alternatively, the map may be displayed on display 134, for example. The map provides a floor plan of the casino or other facility in which system 100 is located, the location of the service station and the location at which card 152 was entered in a card reader, such as gaming location 102.

Club cards are generated by having a player fill out a form and by submitting the form to a clerk at a station that is equipped with a card creator (not shown), for example. Typically, a card creator is located at only one or two work stations, such as service station 132, within a gambling facility. The clerk keys information into the station, and the information is transmitted to central authority 120, which then generates an OCR number, corresponding MAG no. and player ID number for the creation of a new club card. The OCR number and player ID number are stored in the data base in memory 121 in the manner previously described. The central authority then causes the card creator to create a new club card with the stored player ID number and MAG number. Thus, the OCR number is not stored in memory 121 by having the new club card read by a card reader. Once the MAG, OCR and player ID numbers are created, they cannot be changed by a person operating outside system 100.

Central authority 120 includes a central processing unit (CPU) 122 that operates through a network interface 124 and a network 126 to enable communication of the preferences with gaming locations 102, 104 and 106. Network 126 may be a conventional local area network, which allows messages to be sent directly between any of gaming locations 102, 104 and 106, service station 132 and central authority 120. Memory 121 also may store data for various displays shown in FIG. 2, for example. Alternatively and/or in addition, data for the displays may be stored locally in the memories for each of the gaming locations, such as memory 146. In certain embodiments, central authority 12 may be divided among a plurality of computing systems, for example.

Service stations, such as station 132, connect to central authority 120 and gaming locations 102, 104 and 106 over network 126. Service station 132 includes an interface similar to interface 112, a touch screen display 134 similar to display 118 and a keypad 114B similar to keypad 114, as well as a communication unit 135 similar to unit 119. Service stations may be located near a source of drinks and snacks, for example, that may be ordered by players or users of system 100. Several stations, like station 132, may be scattered throughout a large gaming facility.

Figure 2:
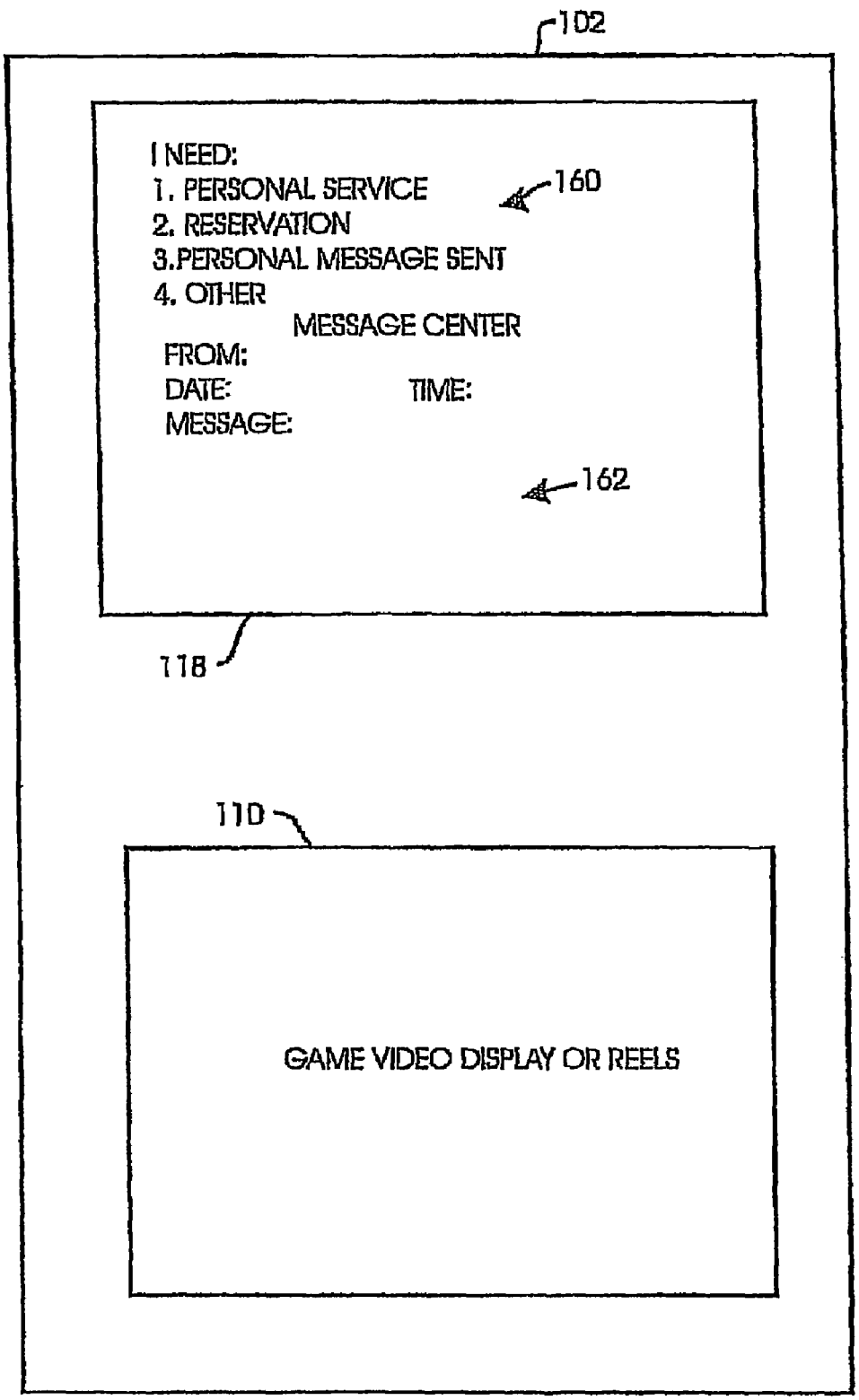
FIG. 2 is a block diagram of one of the gaming location message displays shown in FIG. 1, together with a game video display.

FIG. 2 illustrates message display 118 in relationship to game display 110. Display 118 illustrates an exemplary menu of options 160 for a player or user of system 100, as well as an exemplary space for transmission and/or receipt of messages 162. Display 118 may be implemented as a window in display 110, for example. Display 118 may be used to provide information to players for account access, game play, reservations (e.g., automobile, airline, theater, restaurant, hotel, tour, etc.), messaging, assistance, and/or emergency, for example. Display 118 may be used to receive personal and/or broadcast/multicast messages 162 at a gaming machine, for example. Display 118 may be used to compose and send personal and/or broadcast/multicast messages 162, for example.

Figure 3:
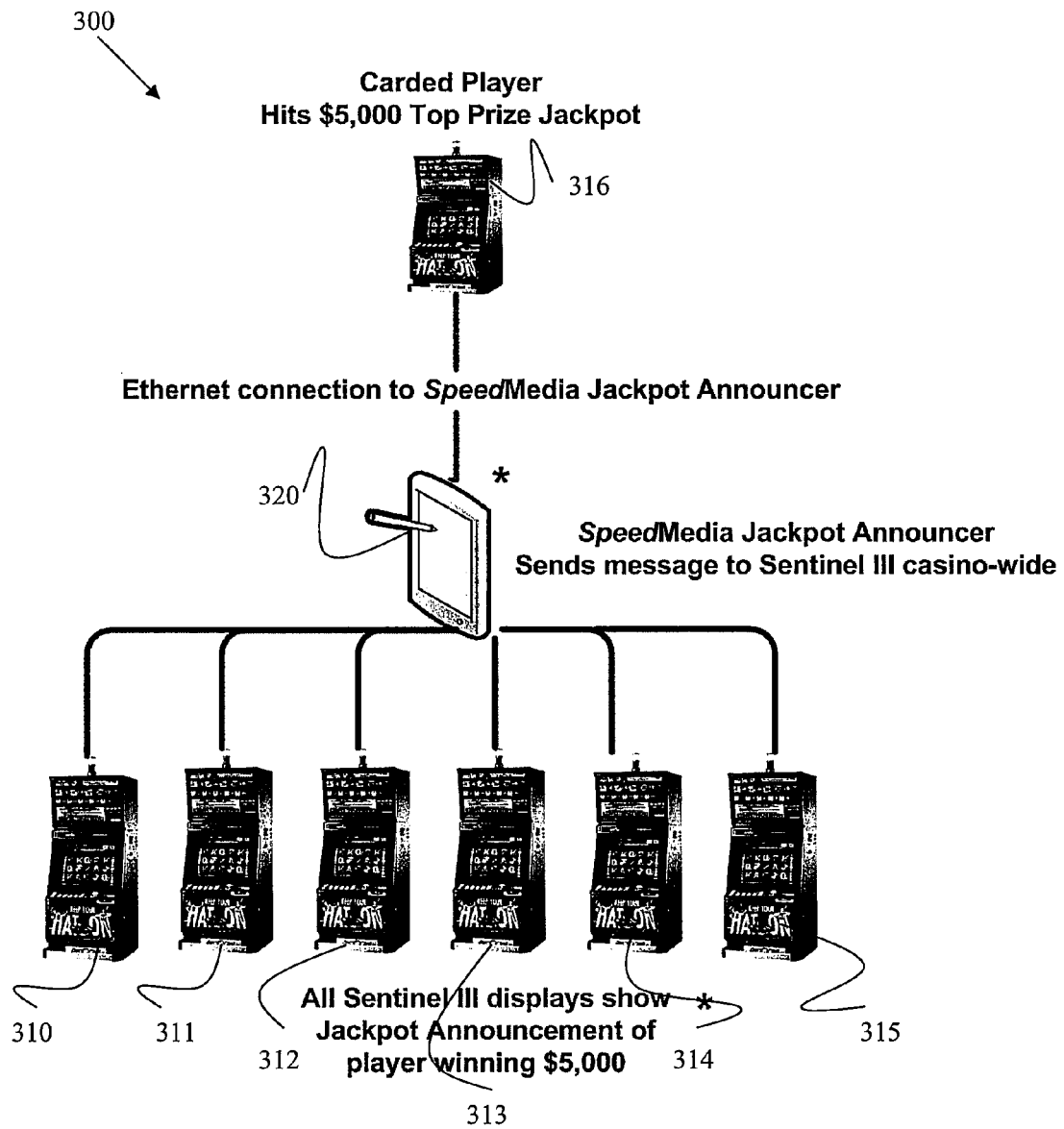
FIG. 3 illustrates an embodiment of a gaming system in accordance with an embodiment of the present invention.
Figure 4:
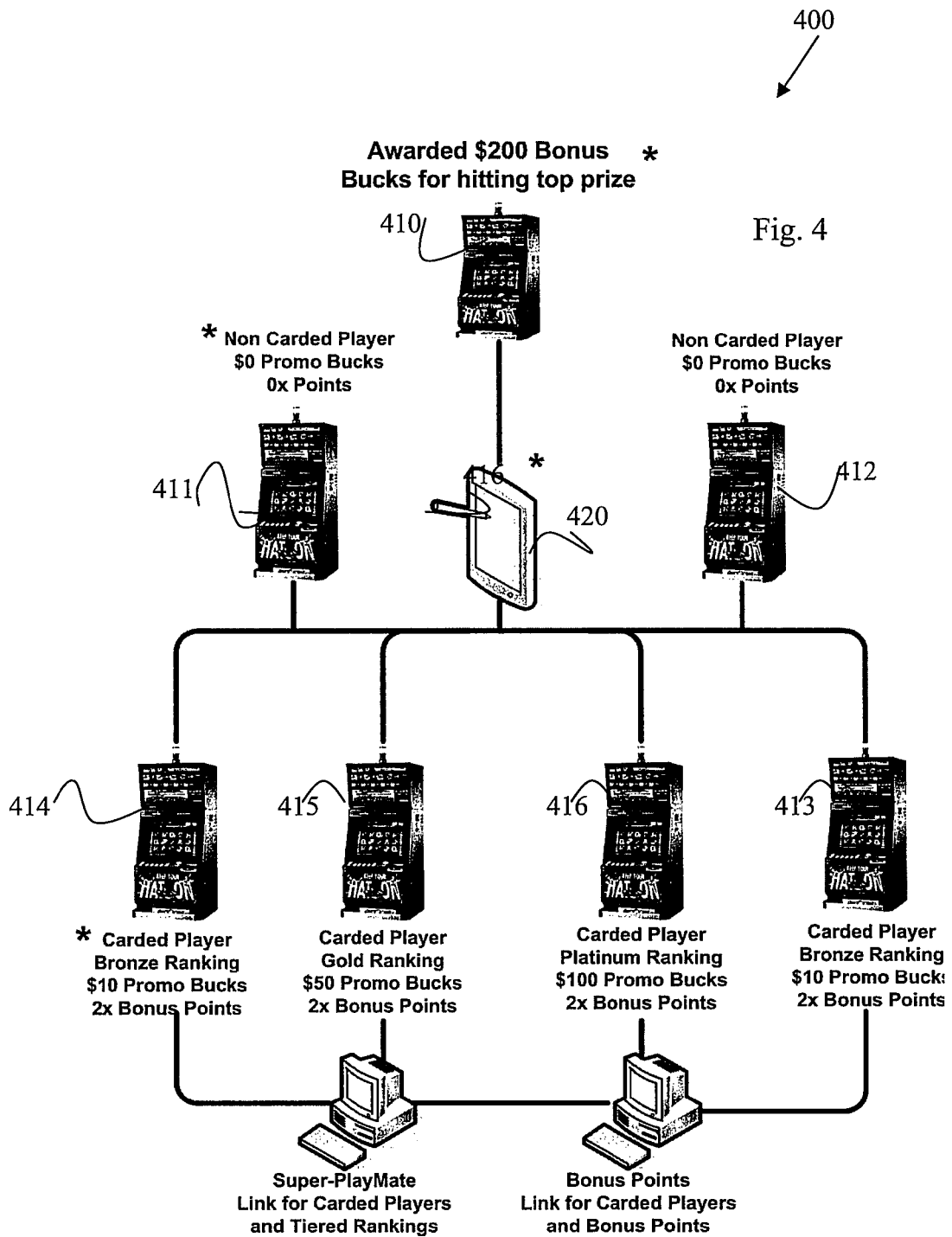
FIG. 4 illustrates another gaming system in accordance with an embodiment of the present invention.

FIG. 3 illustrates an embodiment of a gaming system 300 including a plurality of gaming locations 310-316 and a jackpot announcer 320. The gaming locations 310-316 and the jackpot announcer 320 are connected via one or more interconnected networks, such as an Ethernet network. Gaming locations 310-316 may be similar and/or distinct from gaming locations described above, for example. FIG. 4 illustrates an embodiment of a gaming system 400 similar to gaming system 300 but distinguishing between carded and non-carded players. The components of the systems 300 and 400 may be implemented in a variety of combinations in hardware, software, and/or firmware, for example.

In certain embodiments, the system 300 monitors the gaming locations 310-316 in the system 300. For example, the system 300 may include a central authority and/or other external or internal system to monitor activity at the gaming locations 310-316 in the system 300. In certain embodiments, the gaming system 300 may encompass a single gaming environment, such as a casino, or multiple gaming environments, such as a plurality of related casinos (e.g., Harrahs casinos). Events may be detected at one or more gaming locations 310-316, such as bonus awards, jackpots, and the like.

A display, such as display 118 and/or display 110, may be used to display events such as bonus awards, jackpots, promotions, etc., detected in the gaming system 300 (and/or 400). In certain embodiments, a variety of hidden jackpots, bonus points, credits (cashable and/or non-cashable), and/or other promotions may be distributed to one or more carded players. Using promotions, a gaming establishment can award bonuses, generate gaming excitement, increase activity and play, etc.

Promotions may be configured based on one or more criteria related to game, player, machine, time, etc. For example, one or more promotional criterion may include at least one of a threshold award amount, an award type, a denomination, a gaming type, a time, and a location. Additionally, one or more types of promotions may be configured to be awarded. Promotional configuration may be facilitated by one or more setup screens, "wizards", automated rules, and/or detail menus, for example. The set up wizard may be configured as a menu which issues or provides step-by-step prompts to walk the operator through the set up process to configure the desired award, date and time for the promotion to begin, funding of the award, award level(s), eligible group dynamics and the like.

For example, a shared jackpot may be configured based on a number of carded players eligible for a second jackpot, one or more particular player groups, a type of player interest, a gaming machine bank, and/or a gaming machine type. In another embodiment, a shared jackpot may be configured based on a number of carded players eligible for a second jackpot, player group, player interest, player ranking, and/or a gaming machine group. For a shared jackpot, when a carded top award jackpot is hit, for example, a second jackpot of the same or similar value is divided among a configurable set of carded players. The jackpot may be added to a player account as cashable and/or non-cashable credits, for example.

As another example, a bonus bucks award may be configured based on a coin-in percentage (which may be a system-wide setting), a player ranking, a player group, and/or a player interest. A maximum award amount may also be used as a factor in configuring a bonus bucks award. A bonus bucks award is a personal jackpot that is accumulated as a percentage of coin-in by a carded player to a shared pot of all carded players. If a carded player is playing and wins the top prize on the EGM (for example, $1000 on a standard 25-cent video poker machine), then the player wins both the main prize and his or her share of the bonus bucks jackpot. After the bonus bucks jackpot has been awarded, the personal jackpot amount resets to zero, and the pot starts accumulating again.

As a variation to bonus bucks, the players/machines for the configured group would contribute a portion of the wagers to a common jackpot. When a player of the group hits the award trigger by hitting the top prize, a portion (or all) of the jackpot is awarded to the player. That portion is deducted from the jackpot pool or the pool is reset to zero or a predetermined seed value.

As yet another variation, the jackpot could be funded by the casino rather than from a portion of the wagers, for example.

A splashdown countdown may be configured based on a time limit, a player group, a machine bank, a machine type, a jackpot amount, a bonus point amount, a bonus point multiplier, and/or a promotional credit amount, for example. A start data/time, an end date/time, a player ranking, a machine group, a PBT cash amount, a maximum bonus point award amount, a maximum bonus point multiplier amount, a maximum promotional credit award amount, and/or a maximum PBT cash award amount, for example, may also be used to configure a splashdown countdown. After a carded jackpot has been won, a "splashdown countdown" may occur. A timer appears on a display, such as display 118, notifying the carded player, player group, machine bank, and/or carded players on a specific machine type that the players have X amount of time to hit another jackpot in order to get the "splashdown" bonus. The bonus may include a jackpot, bonus points, promotional credits, and/or a bonus point multiplier, for example.

In certain embodiments, if an award trigger is not satisfied within the configured time period, the bonus award is rolled over to the next splashdown bonus period. In this fashion, the bonus awards may accumulate over several award cycles.

In certain embodiments, an award, such as a splashdown bonus award, may be handpaid at the gaming machine and/or credited to a user's account, such as a user's gaming bank account (e.g., a PersonalBanker™ account), for example A promotional bucks award may be configured based on a time limit, a machine bank, a machine group, tiered rankings, a promotional credit amount, and/or a bonus points multiplier, for example. When a jackpot, such as a bonus bucks jackpot described above, hits, all or some of the carded players on the same machine bank and/or configurable machine group win a fixed promotional credit award (promotional bucks) on their machines. In addition to a promotional bucks award, carded players may be notified via a display, such as display 118, that they will be receiving bonus points for the next X minutes as well.

A ricochet reward may be configured based on a number of ricochets, tiered rankings, a player group, a machine bank, a machine type, allowability of a jackpot reward, allowability of a bonus point reward, and/or allowability of a promotional credit reward, for example. A start date/time, an end date/time, a machine group, a machine denomination, allowability of a PBT cash reward, a maximum bonus point multiplier amount, a maximum promotional credit award amount, and/or a maximum PBT cash award amount, for example, may also be used to configure a ricochet reward. When a carded jackpot has been won, the jackpot triggers a randomizer engine. The engine randomly selects a winner from a configurable group of players and/or machines, for example. From that group, the engine may select another random carded player for another prize. This "ricochet" action may continue until a configurable amount of ricochets has been met. The random prizes awarded may be a jackpot (e.g., a static or random amount), bonus points (e.g., a static or random amount), bonus point multiplier (e.g., a static or random amount), and/or promotional credits (e.g., a static or random amount), for example.

In certain embodiments, promotional activity may be monitored for auditing purposes. Monitoring may include, among other things, activity date/time, slot number, module, description of event, award type, and/or award amount.

In certain embodiments, reports may be generated based on jackpot awards. A shared jackpot report, for example, may include a trigger date/time, a trigger player ID, a trigger player name, a trigger slot number, a trigger amount, an awarded date/time, an awarded player ID, an awarded player name, an awarded amount, an awarded slot number, etc. For example, a bonus bucks report may include a trigger date/time, a trigger player ID, a trigger player name, a trigger slot number, a trigger amount, an awarded date/time, an awarded amount, etc. A splashdown countdown report, for example, may include a promotion name, a promotion start date/time, a promotion end date/time, a promotion time limit, a promotion player criterion (e.g., player group), a promotion machine criterion (e.g., machine group), a promotion cash amount, a promotion bonus point amount, a promotion bonus point multiplier, a promotional credit amount, a maximum cash award amount, a maximum bonus point award amount, a maximum bonus point multiplier amount, a maximum promotional credit award amount, a trigger date/time, a trigger player ID, a trigger player name, a trigger slot number, a trigger amount, a personal trigger date/time, a personal trigger player ID, a personal trigger player name, a personal trigger slot number, a personal trigger amount, an awarded promotion type, an awarded amount, a time limit, etc. A promotional report, for example, displays trigger date/time, trigger player ID, trigger player name, trigger slot number, trigger amount, awarded date/time, awarded player ID, awarded player name, awarded amount, awarded slot number, secondary bonus points multiplier, secondary bonus points earned, time limit, etc. A ricochet report may include a promotion start date/time, a promotion end date/time, a promotion name, a number of ricochets, a promotion player criterion (e.g., a ranking), a promotion machine criterion (e.g., group), allowability for a cash reward, allowability of a bonus point reward, allowability of a promotional credit reward, a maximum cash award amount, a maximum bonus point award amount, a maximum promotional credit award amount, a trigger data/time, a trigger player ID, a trigger player name, a trigger slot number, a trigger amount, an awarded date/time, an awarded player ID, an awarded player name, an awarded amount, an awarded slot number etc. Reports may be run and/or organized according to a variety of criteria. Reports may be run by calendar and/or gaming date and sorted by any of the multiple fields, for example. Reports may include any or all of the information discussed above as well as additional information related to promotions and awards.

In certain embodiments, the gaming system 300 and jackpot announcer 320 may be configured to display jackpot announcement messages to players in a gaming environment. The system 300 and announcer 320 may be configured to disseminate some or all messages based upon certain defined groups, such as a denomination group (e.g., announce dollar jackpots to only $1 players), a player's group (e.g., a rating group, points group, etc.), a group of related players (e.g., family, junket, etc.), and/or the like. Eligibility criteria, such as a group of eligible players, may be manually set by an operator and/or automatically based on comparison of player information to a set of one or more criterion including denomination played, game(s) played, ratings or points earned, player relation, location, etc.

The jackpot announcer 320 informs players at gaming locations 310-316 and/or other points in the gaming system 300 of events meeting one or more set announcement criterion. For example, the jackpot announcer 320 may inform eligible players of selected attendant-paid and/or other jackpots being won through the gaming environment (e.g., a casino), for example. The jackpot announcer 320 may inform players through primary and/or secondary displays incorporated in the gaming locations 310-316 and/or through other displays or screens positioned in the gaming environment (e.g., overhead and/or other displays separate from gaming machine displays. One or more announcement criterion may include a threshold award amount, an award type, a denomination, a gaming type, and/or a location, for example.

In certain embodiments, software may be used to configure announcements in the system 300. For example, a "setup wizard" may be provided to configure announcements. The set up wizard may be configured as a menu which issues or provides step-by-step prompts to walk the operator through the set up process to configure the desired award, date and time for the promotion to begin, funding of the award, award level(s), eligible group dynamics and the like.

Announcement configuration information may include machine setup, for example. Machine setup may allow a user to select from one or more machine criteria, such as machine style (e.g., Reel, Video Reel, Video Poker, etc.), denomination, slot manufacturer, location, and/or entire casino floor. In certain embodiments, a user may configure an announcement to show the machine name and/or slot number during the announcement. Alternatively and/or in addition, machine information may be automatically configured for an announcement based on one or more rules and system information, for example.

Announcement configuration information may include jackpot and/or other award setup information, for example. Jackpot setup may allow a user to set one or more thresholds, for example. For example, a jackpot of $500 or more would show up on penny machines while a jackpot of $1200 or more would show up on quarter, fifty cent, and dollar games. Multiple announcements may be created due to the possibility of multiple machine setups. In certain embodiments, a user may configure an announcement to show the jackpot amount. Alternatively and/or in addition, jackpot information may be automatically configured for an announcement based on one or more rules and system information, for example.

Announcement configuration information may also include player setup information, for example. A user may select to display player names, player nicknames, player numbers, associated groups, etc., and/or an anonymous message as part of the jackpot announcement. Alternatively and/ or in addition, player information may be automatically configured for an announcement based on one or more rules and system information, for example.

Announcement configuration information may also include general or universal information, for example. For example, a general announcement may be shown to every machine on a gaming floor and may be set for jackpots equal to or greater than a configurable amount.

Several events and/or other announcement criterion may be used to trigger a jackpot and/or other award announcement. For example, a jackpot may trigger an announcement. When a hand-paid jackpot, for example, has been awarded, an announcement may be viewed on a gaming location display based on criteria established for the announcement, as described above.

A shared jackpot may also trigger an announcement. For example, when a carded top award jackpot is hit, a second jackpot of the same value is divided among a configurable set of carded players. Once the "shared jackpot" has been dispensed to the players, a notification will appear on the display displaying a congratulations message and the amount won. The announcement or notification may be directed to a specific players group, player interest, machine bank, and/or machine type, for example.

A personal jackpot, such as a Bonus Bucks jackpot, may also trigger an announcement. A Bonus Bucks jackpot, such as an Aristocrat SpeedMedia Bonus Bucks jackpot, is a personal jackpot that is accumulated as a percentage of coin-in by a carded player to a shared pot of all carded players. The coin-in percentage is configurable and is system-wide, while the community pot can be divided by player rankings, player groups, player interest, geography, etc. If a carded player is playing and wins the top prize on the gaming location (ex. $1000 on a standard $0.25 video poker machine), then he/she will win both the main prize and his/her share of the Bonus Bucks jackpot. The amount then resets to zero, and the pot starts accumulating again.

In certain embodiments, after a carded jackpot has been won, a configurable "Splashdown Countdown" may occur. A timer appears on a gaming location display (such as display 118) notifying the carded player, players group, machine bank, and/or carded players on a specific machine type that they have a configurable amount of time to hit another jackpot in order to get the "Splashdown" bonus. The bonus may consist of a set jackpot amount, bonus points, promo credits, and/or bonus point multiplier, for example. In certain embodiments, a manually and/or automatically selected number of eligible machines participates in the Splashdown Countdown, and a gaming device and/or other controller tests for a jackpot trigger to award the Splashdown bonus within a certain period of time.

In certain embodiments, when a jackpot, such as a Bonus Bucks jackpot, hits, then all of carded players on the same machine bank and/or configurable machine group (i.e., Bonus Points Machine Group Setup) will win a fixed promotional credit award, such as SpeedMedia Promo Bucks, on their machines. The promo credit award amount can also be set up using tiered rankings For example, a "Platinum" player may get $100 in promo credits while "Bronze" player may receive $10 in promo credits. In certain embodiments, promotional credits are similar to Aristocrat PersonalBanker promo credits. The promo credit can not be uploaded to the player's card and/or the credits cannot be cashed out, for example. In certain embodiments, promo bucks may be configured to set a time limit for bonus points such that, in addition to a Promo Buck award, carded players are notified via a display that they will be receiving bonus points for the next X minutes as well.

In certain embodiments, a jackpot announcement may be related to a random winner feature. For example, once a user has successfully run a random winner option, a random player will be notified, such as by display 110 at gaming location 102. The notification announcement may be configured as described above.

In certain embodiments, when a carded jackpot has been won, the jackpot triggers a randomizer engine. The engine will then randomly select a winner from a configurable group of players and/or machines. An eligible group of players and/or machines may be selected manually by a user and/or automatically according to system information and one or more sets of rules, for example. From that location, the engine may select another random carded player for another prize (i.e., a ricochet reward). This action may continue until a set amount of ricochets has been met. The random prizes awarded may be a jackpot (random amount), bonus points (random amount), bonus point multiplier (random amount), and/or promo credits (random amount), for example. The number of random ricochets, the jackpot amount, bonus point amount, promo credit amount, player group, and the selected game locations are configurable options, for example. A trigger to begin and/or to propagate a ricochet reward may be based on one or more criterion including coin-in (e.g., for a particular machine and/or total for a gaming environment), coin-out (e.g., for a particular machine and/or total for a gaming environment), etc., for example.

Reports may be generated based on jackpot wins and jackpot announcements. A report may include, for example, a creation date, a user identification, an announcement name, a trigger jackpot amount, a game location criterion/criteria, player criterion/criteria, etc. For example, a Bonus Bucks report may include a Player ID, Player Name, slot number, amount of top award won, and amount of bonus bucks received. A Promo Bucks report may include Player IDs and names of carded players receiving the Promo Bucks, the Player ID and name of the winning player, the promo amount won, and associated tiered ranking the award process may be verified. In certain embodiments, a user may run a report by calendar and/or gaming date and may sort the report by any of the multiple fields. Reports may also include information regarding game play, coin-in, coin-out, jackpot or bonus award, etc., before and/or after an announcement, for example. Report data may be transmitted, stored, and/or processed for summary, trending, accounting, and/or other statistics, for example.

Figure 5:
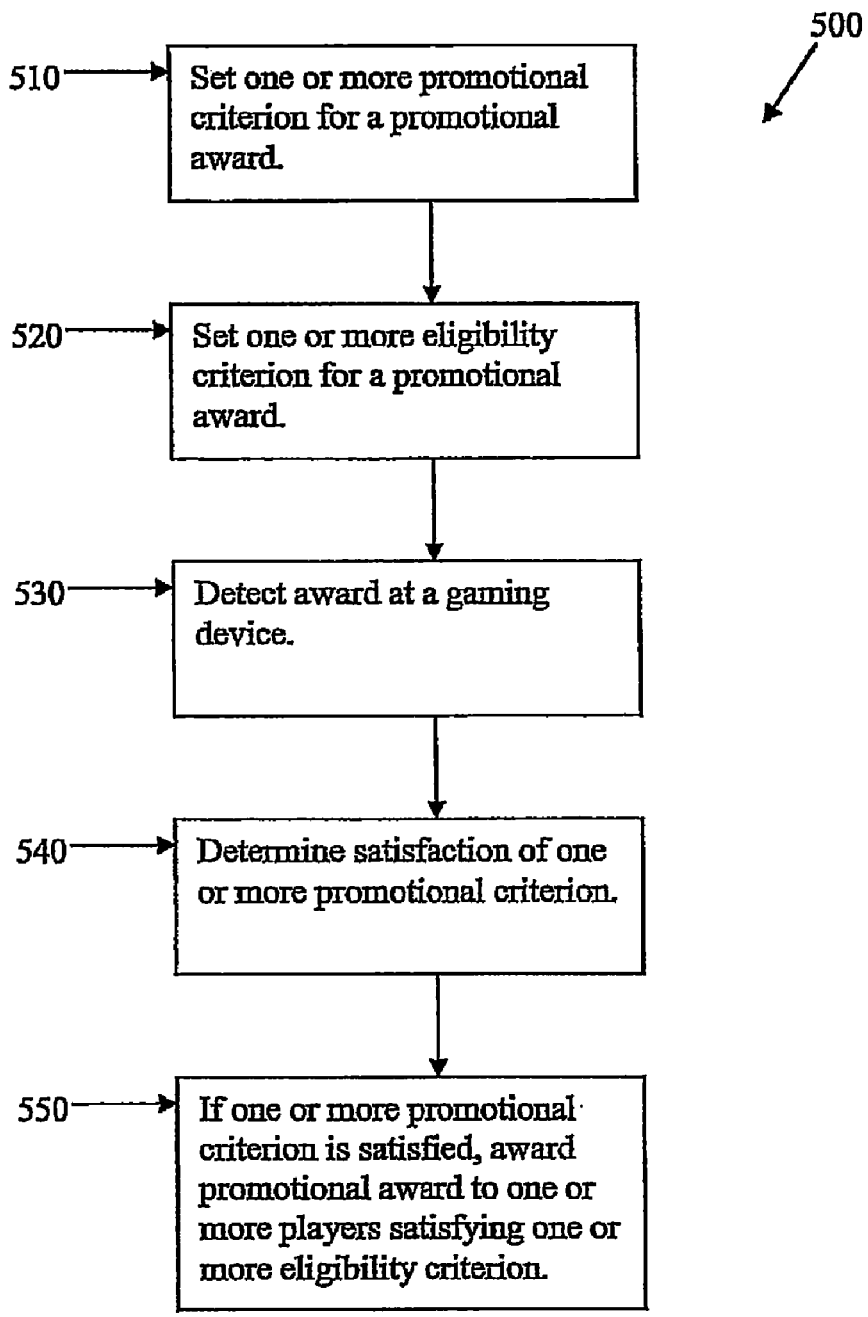
FIG. 5 illustrates a flow diagram for a method for promotional awards in a gaming environment in accordance with an embodiment of the present invention.

FIG. 5 illustrates a flow diagram for a method 500 for promotional awards in a gaming environment in accordance with an embodiment of the present invention. At step 510, one or more promotional criterion is set for a promotional award. For example, promotional criteria/criterion may include a game result, a prize award (such as a jackpot, bonus and/or other prize award), a time, a location, a game type, a machine number, a player classification/ranking, and/or the like. One or more promotional criterion may be set by a user, a regulatory agency, a content provider, a gaming establishment, and/or automatically by one or more rules, for example.

At step 520, one or more eligibility criterion is set for a promotional award. For example, eligibility criteria/criterion may include one or more players or groups of players satisfying a particular denomination, game, rating, points, relationship, location, and/or the like. One or more eligibility criterion may be set by a user, a regulatory agency, a content provider, a gaming establishment, and/or automatically by one or more rules, for example. One or more eligibility criterion defines an intended audience for a promotional award, for example. A promotional system may use the one or more eligibility criterion in conjunction with the one or more promotional criterion and/or other rules/parameters to determine when, where, how, and/or to whom to send a promotional award. In addition, an announcement system may use the one or more eligibility criterion, the one or more promotional criterion, one or more announcement criterion, and/or other rules/parameters to determine when, where, how and/or to whom to send an announcement message regarding the promotional award, for example.

At step 530, an award at a gaming device is detected. For example, a jackpot announcer and/or other gaming system or controller may monitor activity in a gaming environment to detect a jackpot award event and/or other prize event. Gaming activity may be directly monitored from gaming devices and/or from accounting and/or player tracking data collected from gaming terminals, for example.

At step 540, satisfaction of one or more promotional criterion is determined. For example, the jackpot award and/or other event is compared to the one or more announcement criterion to determine if one or more of the promotional criterion are satisfied.

At step 550, if one or more promotional criterion is satisfied, then a promotional award is awarded to one or more players satisfying one or more eligibility criterion. In certain embodiments, Based on satisfaction of one or more promotional band/or announcement criterion, notification of the jackpot award and/or an opportunity for further award(s) and/or bonus play, for example, may be transmitted to one or more players or groups of players satisfying one or more eligibility criterion. Eligible players may then participate in the opportunity provided in the announcement, for example. For example, players may move to eligible machines for bonus or extra incentive game play. Players may elect to participate in a special bonus game or jackpot competition as indicated in the announcement, for example. Players may opt into tournament play as indicated in the announcement, for example.

One or more of the steps of the method 500 may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

In certain embodiments, gaming systems 300, 400, and/or 600 may include sweepstakes opportunities. For example, gaming systems 300, 400, and/or 600 may include and/or be used in conjunction with a sweepstakes module configured to facilitate sweepstakes awards. The sweepstakes module may be implemented in software, hardware and/or firmware, for example. Sweepstakes opportunities may occur as promotional awards, described above, and/or as a separate award, for example.

A sweepstakes pool of eligible players may be configured based on one or more sweepstakes criterion, such as player group, machine group, machine type (e.g., slot, poker, progressive, etc.), machine denomination, machine and/or game manufacturer, game theme or title, location, game type (e.g. video Poker), game play, etc.

Players are awarded virtual sweepstakes entries based on game play. For example, a player may be awarded entries based on (1) having their loyalty club card read by the gaming location and (2) one or more criterion, such as accumulated points, play by a player, machine outcome, jackpots, coin in, coins lost, consecutive games lost or won, special outcomes, per session, at time intervals etc., and the like. In certain embodiments, a limit in number or a time cut-off period may be placed on the promotion.

In certain embodiments, to relate the entry to the player, each entry may be electronically coded to relate to the player, time of day, group configuration and/or the like. For example, each entry may bear a unique entry number, a player identification, card or account number, a group identification number, a unique sweepstake drawing number and/or other information such as gaming location number or the like. In this fashion, the system can identify the entry with the player, gaming location such as machine, group and drawing.

A display, such as a player tracking module display, a gaming location primary and/or secondary display, and/or a separate display in a gaming environment may display a rolling count of sweepstakes entries. The count may include a total number of entries, a number of entries for a player, a number of entries for a group, etc.

A winning entry is randomly selected. At a predetermined or random time, the number of entries is frozen (players cannot earn any more entries for this drawing). At a scheduled time after the pool of entries is frozen, one or more entries is selected from the current sweepstakes pool as the winner(s) and an award is issued to those players.

In certain embodiments, the winner is announced to the gaming environment via a speaker and/or display at a gaming location (e.g., a secondary and/or player tracking module display and speakers) and/or a separate speaker and/or display in the gaming environment.

In one embodiment, the winning player(s) must be present to win the award. In another embodiment, the player to win must be present and meet eligibility requirements such as (1) be within the group to be eligible (e.g., have their card recognized and read at the gaming location and be within the group (player, machine, location) configured to be eligible and (2) meet certain minimum eligibility requirements such as have placed a maximum wager within 30 seconds of the drawing and award, etc.). In yet another embodiment, the player need not be present to win the award but must collect the award within a certain time at the casino. If the player issued the award does not meet the criteria, the system can re-draw virtual tickets until all winners have collected or the award can be rolled over into the next sweepstakes award cycle, for example.

A sweepstakes award may include cash, credit, promotional items, free game play, bonus or feature game play, comps, etc. The award can be issued directly to the player by cash or check, a coupon, in the form of a product such as a car, as an electronic award to a player personal electronic banker account maintained by the casino venue (such as the type described in U.S. Pat. No. 6,511,377 the disclosure of which is incorporated by reference), to an account memory device such as a Smart card, and/or the like.

Figure 6:
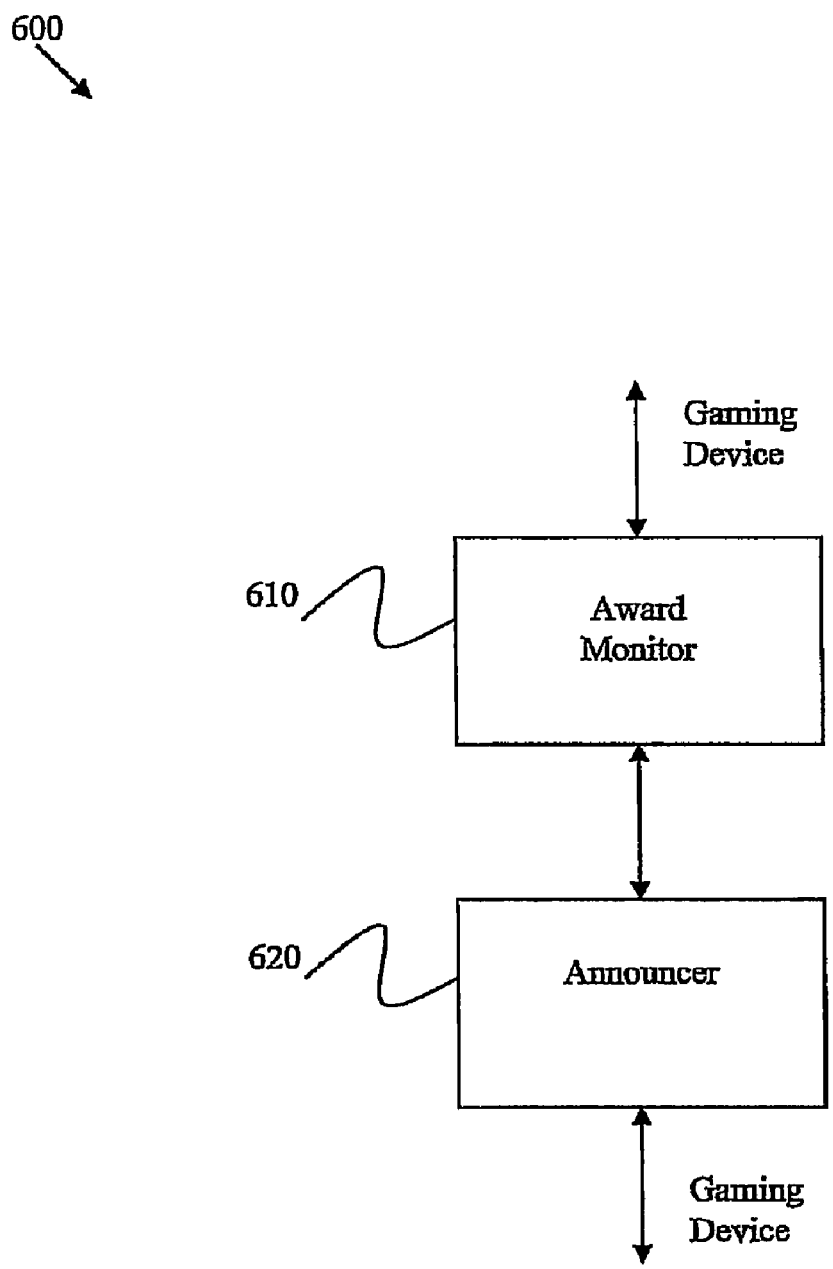
FIG. 6 illustrates an exemplary system for monitoring gaming awards and generating announcements in accordance with an embodiment of the present invention.

For example, as shown in FIGS. 3, 4, and 6, a controller, such as the announcer 320, 420, 620 and/or award monitor 610, can register or assist in registering one or more players at one or more gaming machines 310-316, 410-416 for eligibility in the sweepstakes. For example, player card in and/or other criteria discussed above may allow a player to become eligible for the sweepstakes. The announcer 320, 420, 620 and/or award monitor 610 may work alone and/or in conjunction with another system, such as a player loyalty/tracking system, to register or denote eligible players and track their gaming activities.

The sweepstakes announcer 320, 420, 620 and/or monitor 610, alone or in conjunction with another system, such as a player loyalty/tracking system, tracks gaming activity of the eligible players at gaming machines 310-316, 410-416. Players earn sweepstakes points based on their gaming activity according to one or more rules or criteria described above. At a certain instance (e.g., periodically, at a certain time, at a certain turnover, at a certain game result, at a certain other trigger, etc.), a sweepstakes drawing calculation is executed to determine if the sweepstakes has been one. In certain embodiments, players are given chances to win the sweepstakes based on player points, as described above. In other embodiments, each eligible player has the same chance of winning the sweepstakes. If a winning player is selected, the sweepstakes prize is awarded to that player in the manner described above, for example.

In certain embodiments, an announcement may be sent by the announcer 320, 420, 620 regarding the sweepstakes award. The announcement may be sent to eligible players, to all area gaming machines 310-316, 410-416 at one or more sites, to a separate, secondary display in the gaming environment, etc. The award may be hand paid to the player, generated in the form of coupon, credited to a player's account, etc.

Figure 7:
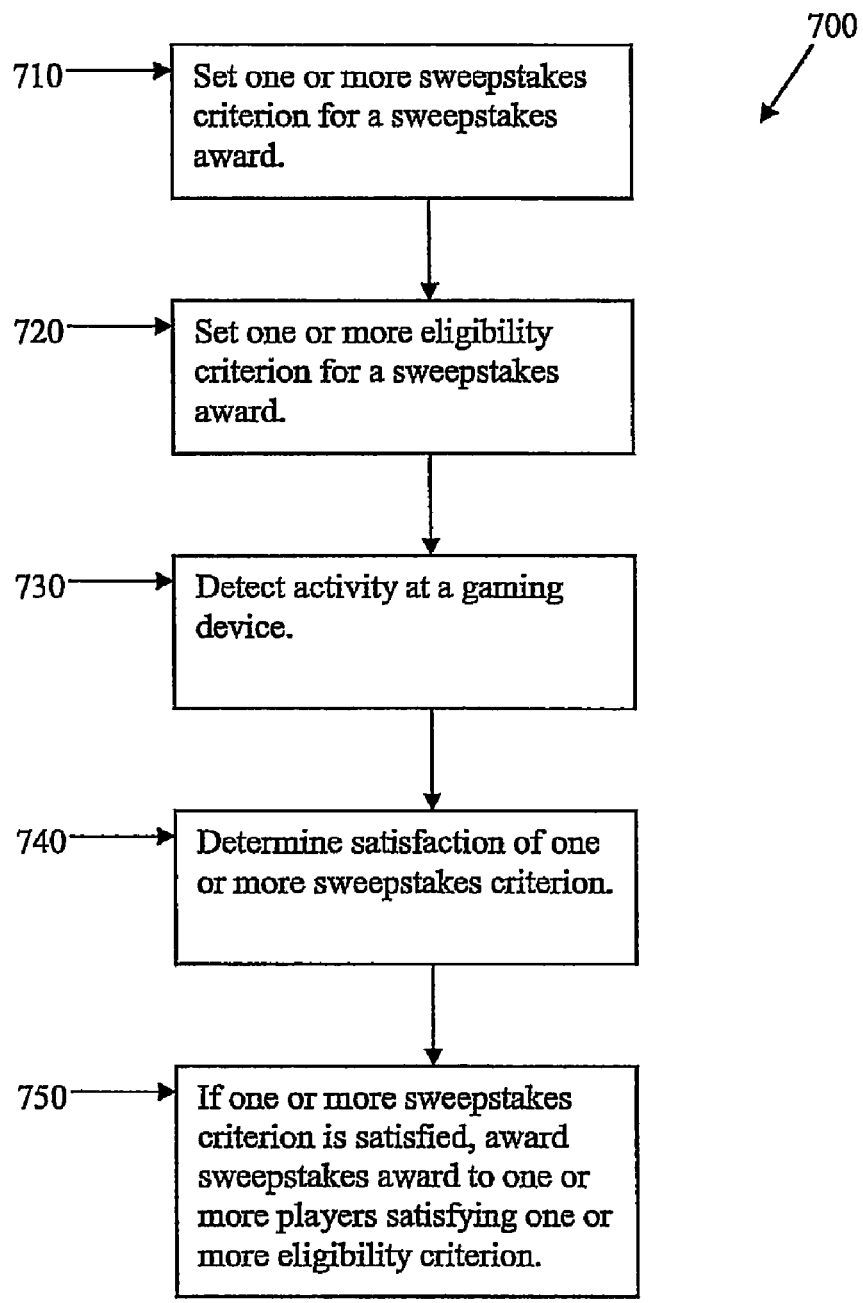
FIG. 7 illustrates a flow diagram for a method for sweepstakes awards in accordance with an embodiment of the present invention.

FIG. 7 illustrates a flow diagram for a method 700 for sweepstakes awards in accordance with an embodiment of the present invention. At step 710, one or more sweepstakes criterion is set for a sweepstakes award. For example, sweepstakes criteria/criterion may include a game result, a prize award (such as a jackpot, bonus and/or other prize award), a time, a location, a game type, a machine number, a player classification/ranking, a random number, a number of player entries, and/or the like. One or more sweepstakes criterion may be set by a user, a regulatory agency, a content provider, a gaming establishment, and/or automatically by one or more rules, for example.

At step 720, one or more eligibility criterion is set for a sweepstakes award. For example, eligibility criteria/criterion may include one or more players or groups of players satisfying a particular denomination, game, rating, points, relationship, location, and/or the like. One or more eligibility criterion may be set by a user, a regulatory agency, a content provider, a gaming establishment, and/or automatically by one or more rules, for example. One or more eligibility criterion defines an intended audience for a sweepstakes award, for example. A sweepstakes award system may use the one or more eligibility criterion in conjunction with the one or more sweepstakes criterion and/or other rules/parameters to determine when, where, how, and/or to whom to check for and distribute a sweepstakes award. In addition, an announcement system may use the one or more eligibility criterion, the one or more sweepstakes criterion, one or more announcement criterion, and/or other rules/parameters to determine when, where, how and/or to whom to send an announcement message regarding the sweepstakes award, for example. Additionally, an announcement may be sent notifying players of the start of a sweepstakes period, for example.

At step 730, activity at a gaming device is detected. For example, a jackpot announcer and/or other gaming system or controller may monitor activity in a gaming environment to detect a jackpot award event and/or other prize event or coin in/card in/game play activity. Gaming activity may be directly monitored from gaming devices and/or from accounting and/or player tracking data collected from gaming terminals, for example.

At step 740, satisfaction of one or more sweepstakes criterion is determined. For example, the gaming related event is compared to the one or more sweepstakes criterion to determine if one or more of the sweepstakes criterion are satisfied. For example, one or more sweepstakes criterion may include at least one of a threshold award amount, an award type, a wager amount, a player identification (e.g., a particular player and/or player group) a denomination, a gaming type, a game result, a time, and a location. Additionally, one or more types of sweepstakes and/or sweepstakes prizes may be configured to be awarded. Sweepstakes configuration may be facilitated by one or more setup screens, "wizards", automated rules, and/or detail menus, for example. The set up wizard may be configured as a menu which issues or provides step-by-step prompts to walk the operator through the set up process to configure the desired award, date and time for the promotion to begin, funding of the award, award level(s), eligible group dynamics and the like.

At step 750, if one or more sweepstakes criterion is satisfied, then a sweepstakes award is awarded to one or more players satisfying one or more eligibility criterion. In certain embodiments, based on satisfaction of one or more sweepstakes and/or announcement criterion, notification of the jackpot award and/or an opportunity for further award(s) and/or bonus play, for example, may be transmitted to one or more players or groups of players satisfying one or more eligibility criterion.

For example, if one or more sweepstakes criterion are satisfied, one or more sweepstakes awards may be automatically provided to one or more eligible players. Alternatively and/or in addition, one or more of the eligible players may be selected for a sweepstakes award based on sweepstakes entries or points earned, etc. In certain embodiments, eligible players may participate in the opportunity provided in a sweepstakes announcement, for example. For example, players may move to eligible machines for bonus or extra incentive game play. Players may elect to participate in a special bonus game or jackpot competition as indicated in the announcement, for example. Players may opt into tournament play as indicated in the announcement, for example.

One or more of the steps of the method 700 may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

While certain embodiments described above discuss a jackpot, certain embodiments also extend to other awards, prizes, bonuses, coupons, promotional credits, and/or other extra opportunities in a gaming environment.

Thus, certain embodiments provide adaptive, programmable gaming systems and methods for disseminating information in a gaming environment. Certain embodiments provide additional gaming and/or award opportunities to eligible players following a triggering event. Certain embodiments provide a technical effect of automated announcements and bonusing in a gaming environment based on preset criteria.

Certain embodiments of the systems and/or methods described above may be implemented using a system, such as the exemplary system 600 shown in FIG. 6, that monitors gaming awards and generates promotional awards and/or announcements in accordance with an embodiment of the present invention. The system 600 is in communication with one or more gaming devices for play by players. The system 600 includes an award monitor 610 configured to detect an award at a gaming device in the gaming system. The award monitor 610 determines satisfaction of one or more announcement and/or promotional criterion by the award. The system also includes an announcer 620 transmitting, upon satisfaction of the promotional/announcement criterion, an award announcement to a group of one or more players satisfying an eligibility criterion. The award announcement may include a promotional award, an opportunity for further play, an informational announcement, etc.

The systems and/or methods described above may also be implemented as a computer-readable medium having a set of instructions for execution on a processor. The set of instructions includes an award monitoring routine configured to detect an award at a gaming device. The award monitoring routine determines satisfaction of an announcement criterion by the award. The set of instructions also includes an announcement routine transmitting, upon satisfaction of the announcement criterion, an award announcement to a group of one or more players satisfying an eligibility criterion.

Several embodiments are described above with reference to drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any machine-readable media for accomplishing its operations. As noted above, the embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor, such as a processor incorporated into an electronic gaming machine or similar device. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention are described in the general context of method steps which may be implemented in certain embodiments by a program product including machine-executable instructions, such as program code, for example in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represents examples of corresponding acts for implementing the functions described in such steps.

Embodiments of the present invention may be practiced in a networked environment using logical connections to one or more remote gaming terminals and/or other computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer.

While the invention has been described with reference to one or more preferred embodiments, those skilled in the art will understand that changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

The invention claimed is:

1. A sweepstakes method for use with a gaming network having a plurality of gaming devices and a controller, the method comprising:
   determining via said controller characteristics of players gaming at a subset of said gaming devices;
   grouping via said controller the players in response to the players having a player characteristic meeting a promotional characteristic;
   monitoring via said controller gaming characteristics of said grouped players at said subset of said gaming devices;
   determining via said controller whether a said monitored gaming characteristic meets a sweepstakes characteristic;
   issuing a virtual sweepstakes ticket with respect to a said grouped player in response to said grouped player meeting said sweepstakes characteristic, said issuing adding a said virtual sweepstakes ticket to a pool of tickets;
   determining whether a pool closing threshold has been met;
   closing said pool of tickets to prevent adding of any additional virtual sweepstakes ticket to said pool in response to said pool closing threshold being met;
   randomly selecting at least one virtual sweepstakes ticket from said pool of tickets, the selected ticket serving as a winning ticket; and
   awarding a promotional award to said grouped player having said issued sweepstakes ticket.

2. The method of claim 1, wherein said sweepstakes characteristic is based on accumulated points, machine outcome, or coin in, at said subset of said gaming devices.

3. The method of claim 1, wherein said promotional characteristic comprises at least one of a device group, a device denomination, a device type, a device manufacturer, a game manufacturer, a game theme, and a game title.

4. The method of claim 1, further comprising determining a trigger to initiate a random selection of a winning ticket from said pool of tickets.

5. The method of claim 1, wherein said promotional award include at least one of an amount of cash, a number of credits, a number of promotional items, a number of free game plays, a number of bonus game plays, a number of feature game plays, and comps.

6. The method of claim 1, further comprising announcing said winning ticket via a secondary display.

7. The method of claim 6, wherein said secondary display comprises a display at a gaming device of said subset and a display apart from said subset.

* * * * *